(12) United States Patent
    Sirinamaratana et al.

(10) Patent No.: US 9,818,055 B2
(45) Date of Patent: Nov. 14, 2017

(54) SYSTEMS, DEVICES, CIRCUITS AND METHODS FOR COMMUNICATING IN A COMMUNICATION SYSTEM

(75) Inventors: Pairote Sirinamaratana, Bangkok (TH); Karn Opasjumruskit, Bangkok (TH)

(73) Assignee: SILICON CRAFT TECHNOLOGY CO., LTD., Bangkok (TH)

( * ) Notice: Subject to any disclaimer, the term of this patent is extended or adjusted under 35 U.S.C. 154(b) by 514 days.

(21) Appl. No.: 14/005,559

(22) PCT Filed: Mar. 18, 2011

(86) PCT No.: PCT/TH2011/000006
    § 371 (c)(1),
    (2), (4) Date: Sep. 17, 2013

(87) PCT Pub. No.: WO2012/128732
    PCT Pub. Date: Sep. 27, 2012

(65) Prior Publication Data
    US 2014/0002244 A1    Jan. 2, 2014

(51) Int. Cl.
    *G06K 19/077*    (2006.01)
(52) U.S. Cl.
    CPC ..... *G06K 19/077* (2013.01); *G06K 19/07749* (2013.01)
(58) Field of Classification Search
    CPC ................. G06K 19/077; G06K 19/07749
    USPC ......................................... 340/10.1
    See application file for complete search history.

(56) References Cited

U.S. PATENT DOCUMENTS

| | | | | |
|---|---|---|---|---|
| 4,549,176 A | * | 10/1985 | Kreft ................. | G07C 9/00309 340/10.1 |
| 2004/0203361 A1 | * | 10/2004 | Belcher .................. | G01V 15/00 455/41.2 |
| 2005/0063488 A1 | * | 3/2005 | Troyk .................. | G06K 7/0008 375/316 |
| 2006/0286938 A1 | * | 12/2006 | Murdoch ................ | G01S 13/74 455/73 |
| 2008/0164978 A1 | * | 7/2008 | Tanada ................. | H04B 5/0012 340/10.1 |

(Continued)

FOREIGN PATENT DOCUMENTS

| WO | 02/23471 A1 | 3/2002 | |
|---|---|---|---|
| WO | WO0223471 A1 * | 3/2002 | ............. G06K 19/07 |

*Primary Examiner* — Edwin Holloway, III
(74) *Attorney, Agent, or Firm* — Horizon IP PTE LTD.

(57) ABSTRACT

Example embodiments relate to a circuit, communication device, communication system, computer readable medium and method for communicating in a communication system. The communication device comprises an antenna, a resonant storage element for storing at least some energy received by the antenna, a processor for controlling a release of stored energy to generate a modulated signal upon receiving an interrogating signal from one or more reader devices, wherein said modulated signal is a signal comprising digital data represented by at least one predefined sequence of transitions between a high energy level and a low energy level, and a selective energy circuit in selective cooperation with the resonant storage element to affect a greater high energy level amplitude of the modulated signal upon the modulated signal transitioning from a low energy level to a high energy level when in cooperation.

20 Claims, 17 Drawing Sheets

(56) References Cited

U.S. PATENT DOCUMENTS

2008/0315995 A1    12/2008  Okuda
2009/0134979 A1     5/2009  Tsukamoto et al.
2009/0200985 A1*  8/2009  Zane .................... H01Q 1/2225
                                                           320/108

* cited by examiner

SYSTEMS, DEVICES, CIRCUITS AND METHODS FOR COMMUNICATING IN A COMMUNICATION SYSTEM

FIELD

Example embodiments relate generally to circuits, devices, systems and methods for communicating in communication systems.

BACKGROUND

In recent years, various forms and configurations of communication systems have been designed and developed for use in many applications and industries. Conventional communication systems include one or more reader devices in limited-range communication with one or more communication devices. A reader device is typically configured to periodically, intermittently or continuously broadcast an interrogating signal in one or more directions in and around its vicinity to one or more communication devices that are within communication range.

Various configurations of communication systems are in use today, such as those having a stationary reader device and at least one portable communication device, a portable reader device and at least one stationary communication device, and a portable reader device and at least one portable communication device. In applications requiring one or more portable communication devices and/or reader devices, such as access key applications for gaining access to a secured facility, there are several important and interrelated factors that are considered, including the achievable communication range between the communication device and the reader device, the size of the portable communication device, and the duration of use of the portable communication device before maintenance, such as the operational duration of the portable communication device before its battery must be replaced. In regards to communication range, it is typically desirous that the distance be as large as possible. In achieving larger communication ranges, however, it is generally known that a communication device will require, among other things, a sufficiently larger source of stored energy, such as a battery, to generate a stronger response signal. The inherent trade-offs with having larger energy sources pertain to the inherently increased size and shortened useable duration of the communication device. Specifically, in having a larger energy source, the size of the communication device will correspondingly become larger as a result. Furthermore, the useable duration before maintenance of the communication device will generally become shortened due to the increase in power consumption and the need for replacing or recharging the energy source, such as a battery.

A conventional communication device having one or more external energy sources, such as a battery, is generally referred to as an active device. Recent advances in communication systems have resulted in the widespread use of passive communication devices, that is, those which do not utilize an external energy source, such as a battery. In general, a passive communication device only becomes activated to process and transmit a response signal upon coming into sufficient communication range of a reader device. Upon coming into communication range of a reader device and receiving a broadcasted interrogating signal from the reader device, the communication device converts the signal into energy. This energy is then stored and made available for processing and generating a response signal. In this regard, the amount of energy that is converted and stored will depend directly on the received signal strength of the broadcasted interrogating signal, which is directly related to the distance between the communication device and the reader device. Because passive communication devices do not utilize an external energy source, such as a battery, their size can be substantially smaller than active communication devices. Furthermore, passive communication devices do not suffer from the same problem of having a limited duration of use before maintenance since there are no batteries to replace. However, because passive communication devices can only convert and store a small amount of energy, passive communication devices will inherently have much shorter communication ranges when compared with active communication devices.

In general, conventional communication systems are limited by problems pertaining to increasing the communication range and improving the reliability of communications at extreme communication range distances of the communication system. For instance, irrespective of whether the communication system is active, passive or a combination thereof, a communication device may be within receiving range of a weak interrogating signal from a reader device but still not be within communicable range. This may be due to, among other reasons, the weakness of the received broadcasted interrogating signal at the communication device and/or the weakness of the received response signal at the reader device. In this respect, such problems typically occur slightly within, at or slightly beyond the maximum communication range distances designed for the communication system.

Presently, there are several known ways to improve the communication range of a communication system. For example, increasing of the strength of a transmitted interrogating signal can effectively increase the communication range and storable energy in communication devices. However, such improvements to the reader device are expensive and typically require corresponding improvements to the antenna and/or size of the energy source of the communication device, which typically results in an increase in size and reduction in duration of use of the communication device, and an increase in the overall cost and complexity of the communication system. Furthermore, such improvements have not been able to improve the reliability of communication at extreme communication ranges. As another example, improving the antenna of the reader device and/or communication device to a higher quality, lower loss and/or larger size antenna may also increase the communication range of the system. However, such improvements will not only increase the size and reduce the duration of use before maintenance of the communication device, but also substantially increase the overall cost and complexity of the communication system. Furthermore, such improvements have not been able to improve the reliability of communication at extreme communication ranges. As another example, reducing the power consumption of the processor of the communication device and/or adding an external energy source, such as a battery, will effectively improve the communication range. However, such improvements will typically result in an increase in size and/or reduction in duration of use before maintenance of the communication device, and also increase in the overall cost and complexity of the communication system. Furthermore, such improvements have not been able to improve the reliability of communication at extreme communication ranges. An example comparison of a modulated response signal (A) generated using any one or more of these known communication range improvement methods and a modulated response signal (B) not using one of these known improvement methods is illustrated in FIG. 1. In this regard, despite improving communication range, all of these existing solutions share common associated problems pertaining to increased size, reduction of duration of use before maintenance and/or substantial increase in overall costs and complexity of the communication system. Furthermore, all of these existing solutions fail to improve the reliability of communication at extreme communication ranges of the communication system.

SUMMARY

Under conventional means, improving of communication range has been achieved by improvements in the reader device through increasing transmission power from the reader device, improving antenna quality and loss of the reader device and/or communication device, increasing size and sensitivity of the antenna of the reader device and/or communication device, optimizing the antenna matching of the reader device and the communication device using various tuning processes, reducing power consumption of the communication device, and using an external energy source, such as a battery. These improvements in the reader device and/or communication device are not only expensive and complex, but also increase the size of the communication device and/or reduce duration between maintenance of the communication device. Furthermore, all of these existing improvements fail to improve the reliability of communication at extreme communication ranges of the communication system.

In considering the above problems and conventional solutions, it is realized herein that the achievable communication range and reliability of communications at extreme communication ranges of a communication system are not only limited by the achievable highest peak amplitude of high energy level segments of a modulated response signal, but in fact also significantly limited by the inherently slow (gradual) change in energy level of a high energy level segment upon transitioning from a low energy level to a high energy level. An example of a slow (gradual) change in energy level of a high energy level segment until reaching its highest peak is illustrated in both modulated signals of FIG. 1. This slow change in energy level is also recognized herein to directly affect the transient response time of the reader device in receiving and demodulating the modulated response signal, and thus limit the communication range and reliability of communications in extreme communication ranges of the overall communication system.

Present example embodiments relate generally to a low cost, simple, compact and efficient solution to improving the communication range and reliability of communications at extreme communication ranges of communication systems by improving the overall amplitude of the high energy level segments of the response signal, the shape of the modulated response signal, that is, creating a fast change in energy level upon transitioning from a low energy level to a high energy level, and the transient response time of the modulated response signal.

An example embodiment relates generally to a communication device for communicating with one or more reader devices, said communication device comprising an antenna, a resonant storage element for storing at least some energy received by the antenna, a processor for controlling a release of stored energy to generate a modulated signal upon receiving an interrogating signal from one or more reader devices, wherein said modulated signal is a signal comprising digital data represented by at least one predefined sequence of transitions between a high energy level and a low energy level, and a selective energy circuit in selective cooperation with the resonant storage element to affect a greater high energy level amplitude of the modulated signal upon the modulated signal transitioning from a low energy level to a high energy level when in cooperation.

Another example embodiment relates generally to a circuit in a communication device, said communication device for use in generating a modulated signal and having an antenna, a resonant storage element and a processor, said circuit comprising an energy means for selectively cooperating with the resonant storage element to affect a greater high energy level amplitude of the modulated signal when the modulated signal transitions from a low energy level to a high energy level when in cooperation.

Another example embodiment relates generally to a method of communicating between one or more reader devices and a communication device in a communication system, comprising the steps of transmitting an interrogating signal from a reader device, receiving, at the communication device, the interrogating signal, converting, at the communication device, the received interrogating signal into storable energy, storing the converted energy, retrieving, at the communication device, data stored in internal memory and generating a modulated signal using the converted energy, wherein said modulated signal is a signal comprising the retrieved data represented by at least one predefined sequence of transitions between a high energy level and a low energy level, generating, at the communication device, a response signal for transmitting to the reader device by affecting an increase in high energy level amplitude of said modulated signal upon or after said modulated signal transitioning from a low energy level to a high energy level, and receiving, at a reader device, the response signal.

Another example embodiment relates generally to a communication system comprising one or more reader devices, wherein at least one reader device is for transmitting an interrogating signal and at least one reader device is for receiving a response signal, and a communication device for receiving an interrogating signal from at least one reader device, converting the interrogating signal into storable energy, storing said converted energy into a resonant storage element, using said stored energy to generate a modulated signal, and generating a response signal for transmission to at least one reader device by affecting an increase in high energy level amplitude of the modulated signal upon or after the modulated signal transitioning from a low energy level to a high energy level.

Another example embodiment relates generally to a computer readable medium having encoded thereon a set of instructions executable by at least one controller capable of performing one or more operations on a circuit of a communication device, the set of instructions comprising monitoring a modulated signal, said modulated signal comprising digital data represented by at least one predefined sequence of transitions between a high energy level and a low energy level, and releasing stored energy from the circuit to affect a greater high energy level amplitude of the modulated signal upon or after the modulated signal transitioning from a low energy level to a high energy level.

Although example embodiments may provide for an improved communication system, with some references to example embodiments in the RFID communications industry, it is to be understood by persons ordinarily skilled in the art that example embodiments can also be for use in other forms of communication systems, industries and applications, including other types of communication other than RFID.

BRIEF DESCRIPTION OF THE DRAWINGS

Although similar reference numbers are used to refer to similar elements for convenience, it can be appreciated that each of the various example embodiments may be considered to be distinct variations.

DETAILED DESCRIPTION OF THE DRAWINGS

The present invention will now be described hereinafter with reference to the accompanying drawings, which form a part hereof, and which illustrate example embodiments by which the invention may be practiced. As used in the disclosures and the appended claims herein, the term "example embodiment" does not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. Furthermore, as used herein, the term "in" includes "in" and "on", and the terms "a", "an" and "the" include singular and plural references. Furthermore, as used herein, the term "by" may be construed to mean "from", depending on the context. Furthermore, as used herein, the term "if" may be construed to mean "when" or "upon" or "in response to", depending on the context.

Figure 1:
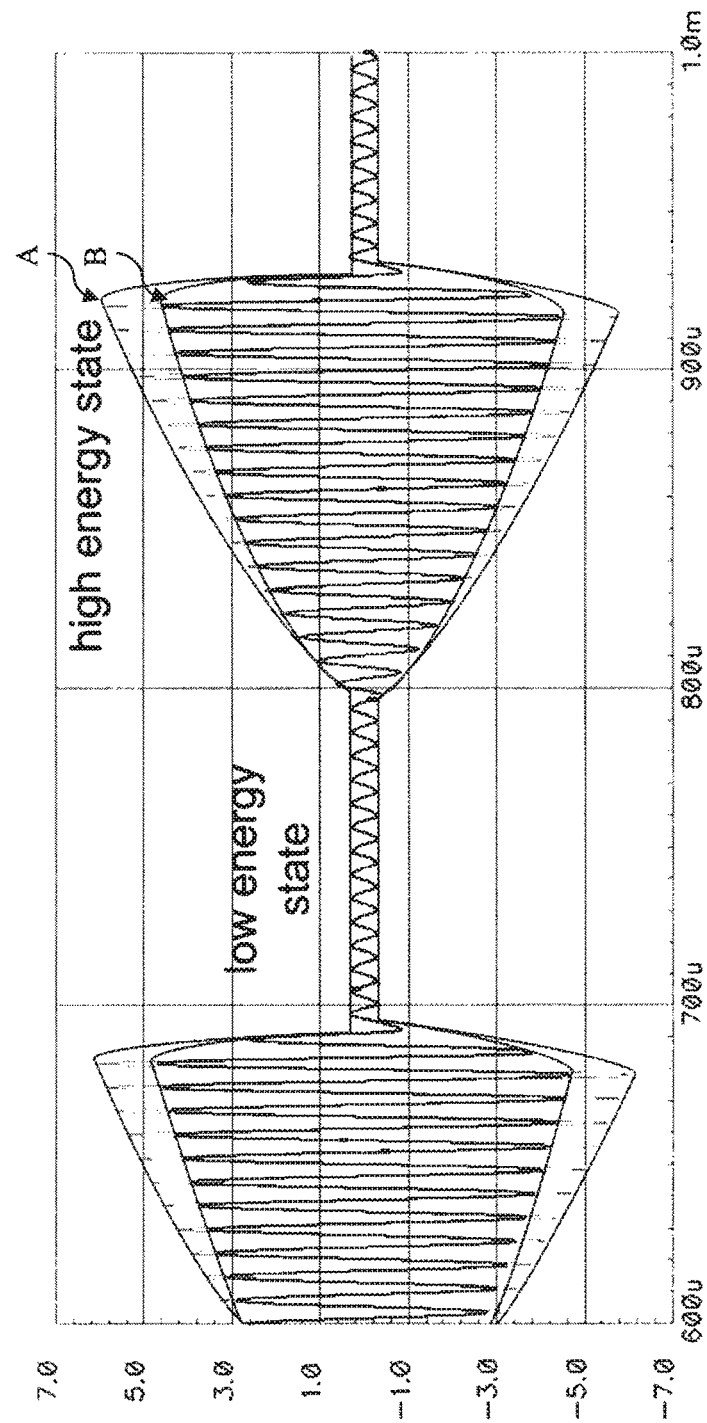
FIG. 1 is a diagram illustrating a comparison of improvements to the response signal using conventional methods.
Figure 2:
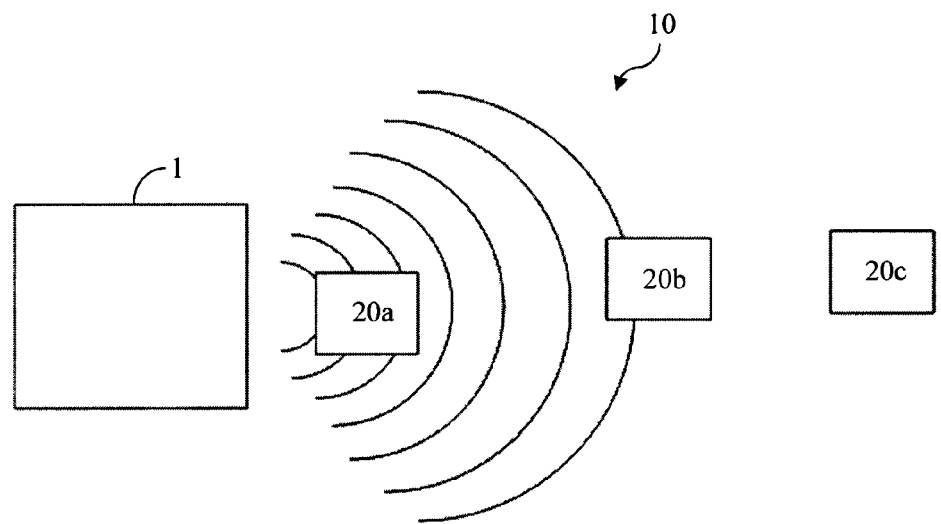
FIG. 2 is a diagram illustrating a communication device in communication range with a reader device, in an extreme communication range with a reader device and out of communication range from a reader device.
Figure 3:
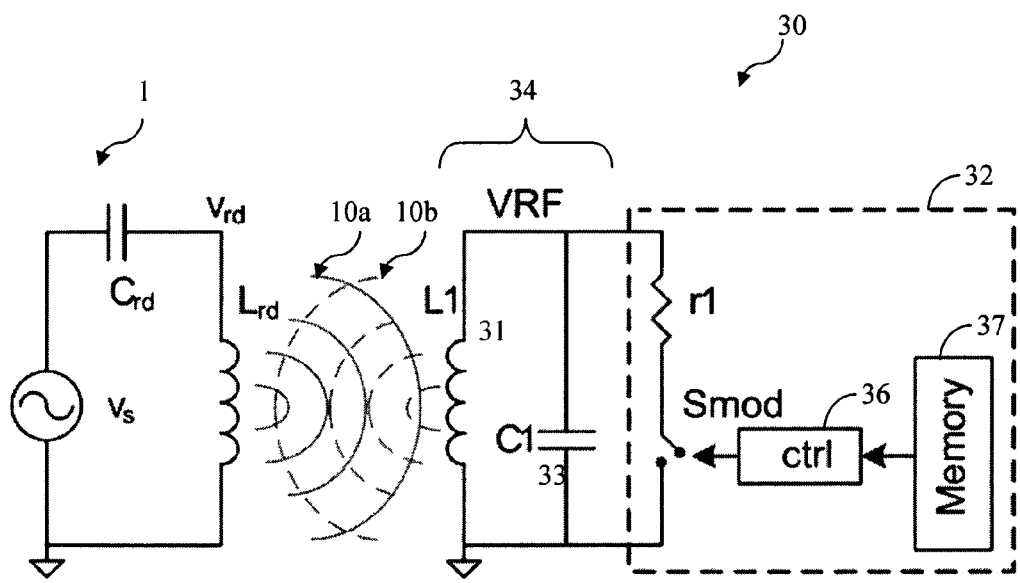
FIG. 3 is a block circuit diagram of a reader device and a passive communication device.
Figure 4:
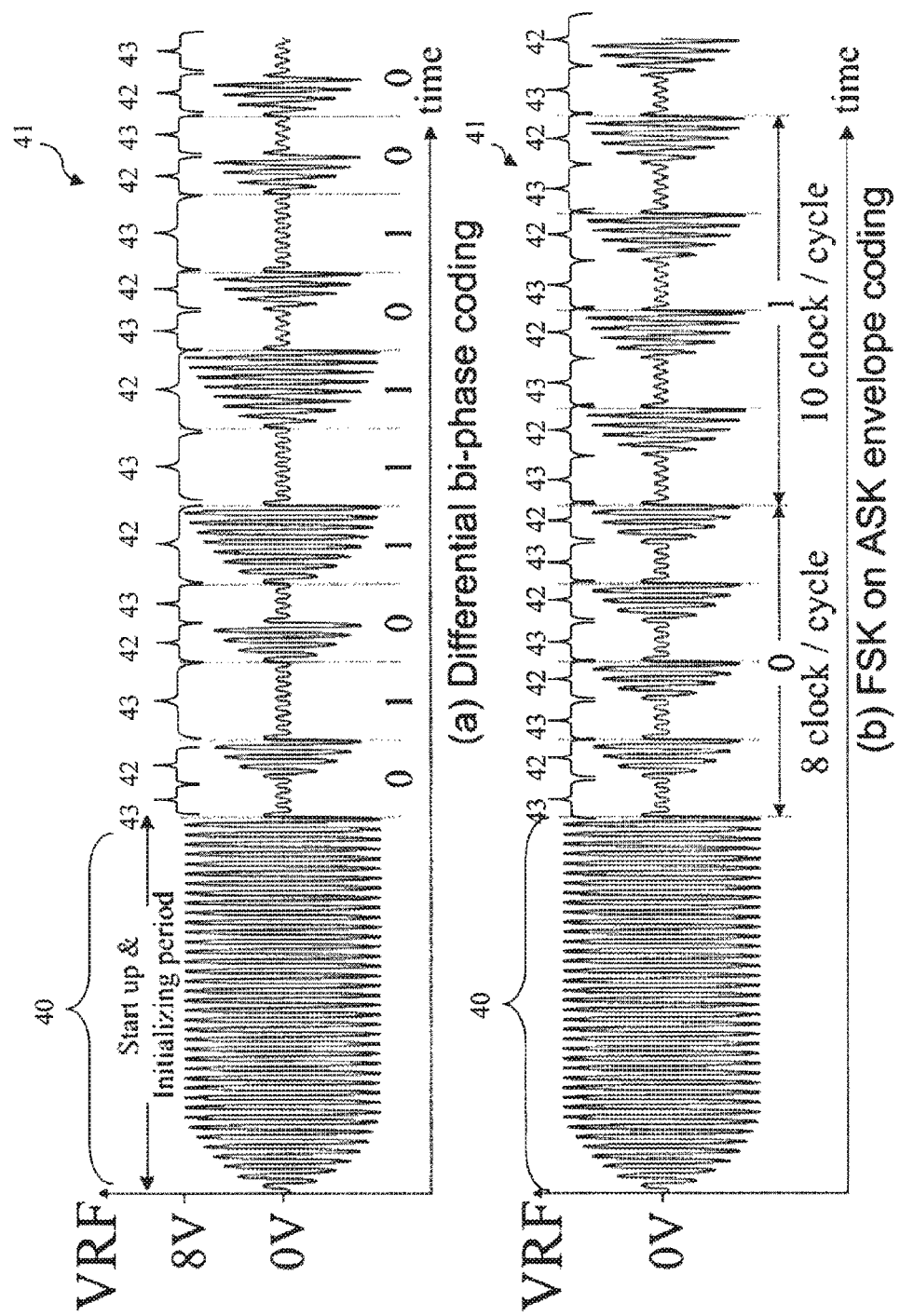
FIG. 4 is a diagram illustrating two examples of a signal modulated by a communication device using well-known modulation standards/protocols.

An example of a communication device $20a$, $20b$ within sufficient communication range of a reader device 1, a communication device $20c$ outside of communication range of a reader device 1 and a communication device $20b$ around an extreme communication range of a reader device 1 is shown in FIG. 2. A reader device 1 is typically configured to periodically, intermittently or continuously broadcast an interrogating signal $10a$ in one or more directions in and around its vicinity. As depicted in FIG. 3, when an antenna 31 of a communication device 30 receives an interrogating signal $10a$, a processor 32 initiates to generate and transmit a response signal $10b$ to the reader device 1. The response signal $10b$ is generated by a controller 36 of the processor 32 reading data from internal memory 37 and modulating the data using one of many available digital modulation methods, such as amplitude shift keying (ASK), frequency shift keying (FSK), phase shift keying (PSK) and derivations thereof, such as FSK on ASK envelope coding and differential bi-phase coding. FIG. 4 depicts examples of response signals generated by a communication device using known modulation standards/protocols.

Figure 5:
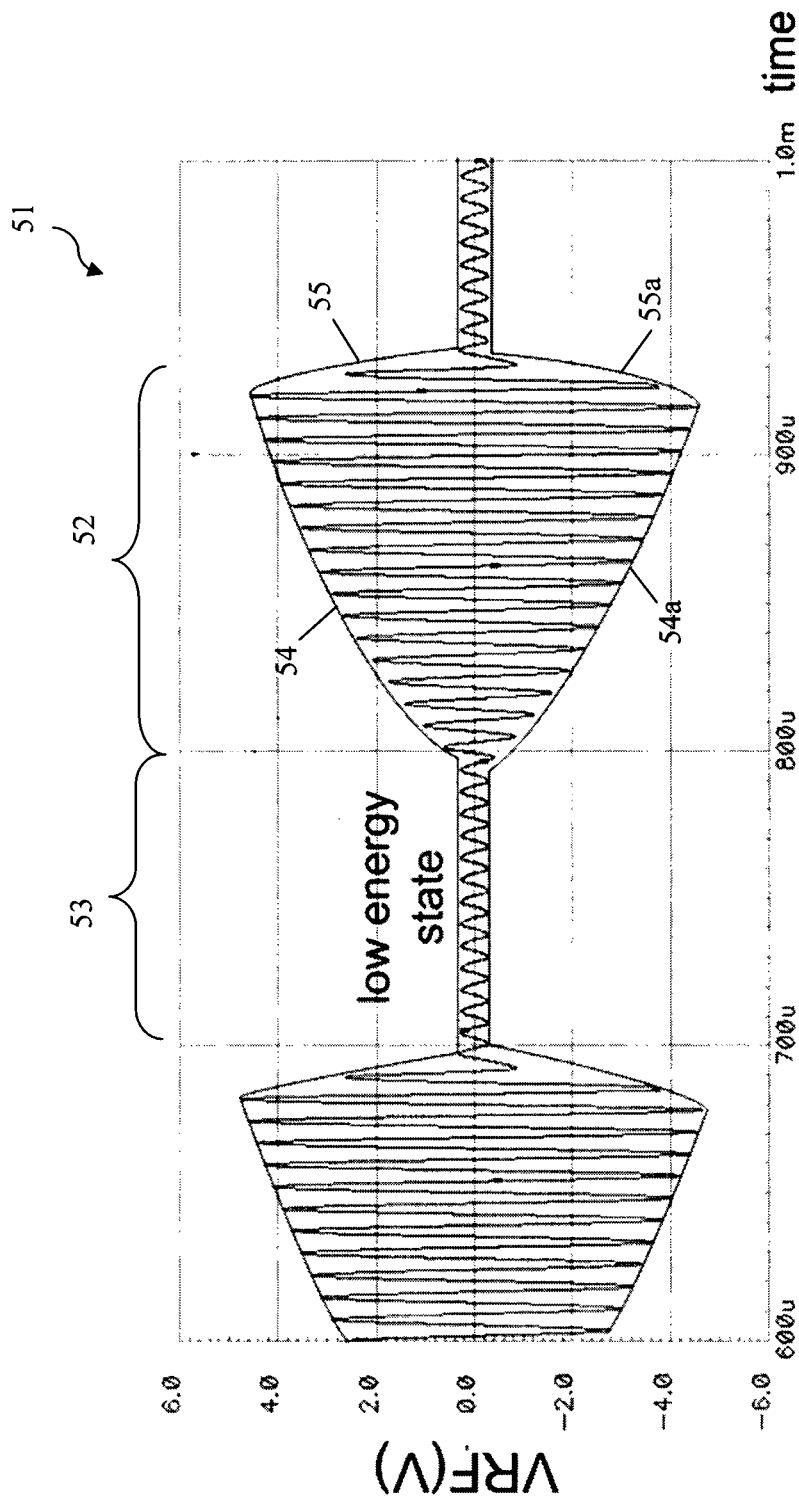
FIG. 5 is a diagram illustrating an example of a low energy level segment and a high energy level segment of a signal modulated by a communication device, and the transition between a low energy level and a high energy level.

A communication device coming within sufficient communication range of a reader device will initialize by performing a start-up and initialization process 40, as illustrated by the example modulated response signals of FIG. 4. Thereafter, the communication device will retrieve internally-stored data and process the data to transmit a modulated response signal 41. As illustrated in the examples of FIGS. 4 and 5, the amplitudes within each high energy level segment 42, 52 of a response signal 41, 51 of conventional communication systems will gradually increase after transitioning from a low energy level 43, 53 to a high energy level 42, 52. This is readily seen by the gradual upwardly sloping shape of an envelope drawn around the upward high energy level segment 54 shown in FIG. 5. It is to be understood herein that references to an upward sloping shape, upward high energy level segment, or the like, of a signal will refer to the positive aspects of the signal (that is, those sections of the signal that are on or above the horizontal axis of a signal represented in time), such as the envelope 54 of FIG. 5, and said references are to be understood herein to equivalently refer to a downward sloping shape, downward high energy level, and the like, of the signal when considering the corresponding negative aspects of the signal (that is, those sections of the signal that are a reflection about the horizontal axis of a signal represented in time), such as the envelope 54a shown in FIG. 5. A transition from a high energy level 52 to a low energy level 53, on the other hand, will occur much more rapidly, as illustrated by the steep downward sloping shape of an envelope drawn around the downward high energy level segment 55 shown in FIG. 5. It is to be understood herein that references to a downward sloping shape, downward high energy level segment, or the like, of a signal will refer to the positive aspects of the signal (that is, those sections of the signal that are on or above the horizontal axis of a signal represented in time), such as the envelope 55 shown in FIG. 5, and said references are to be understood herein to equivalently refer to an upward sloping shape, upward high energy level, and the like, of the signal when considering the corresponding negative aspects of the signal (that is, those sections of the signal that are a reflection about the horizontal axis of a signal represented in time), such as the envelope 55a shown in FIG. 5.

Figure 6:
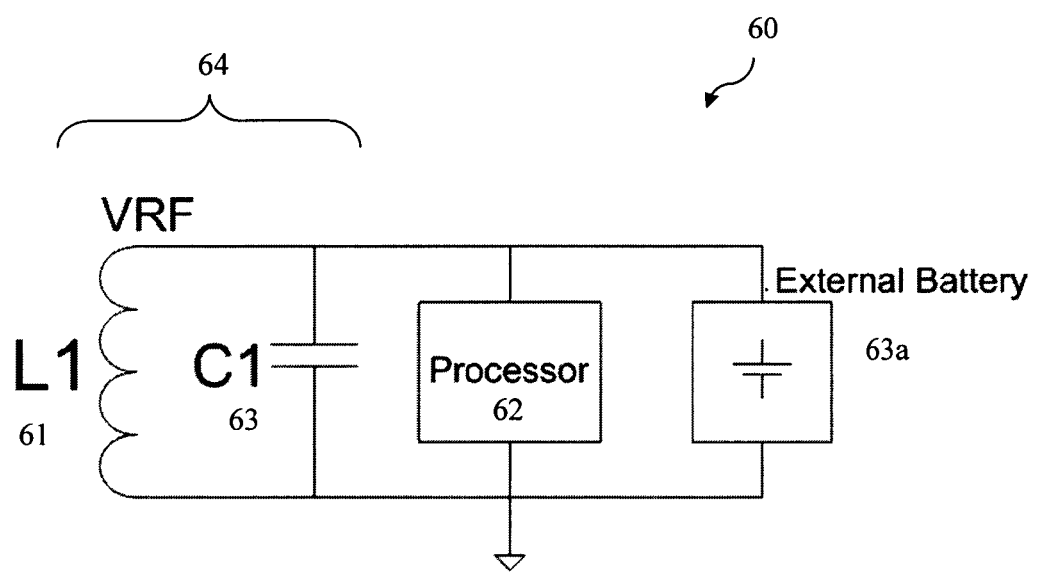
FIG. 6 is a block circuit diagram of an active communication device.

An example of an active device is illustrated in FIG. 6, wherein an external energy source 63a of the active device 60 will promptly supply the needed energy for its processor 62 to process and transmit a response signal to a reader device upon receiving a broadcasted interrogating signal. Similar to an active device, a passive communication device 30 typically includes a resonant circuit 34, or the like, comprising an antenna 31 coupled with a resonant storage element 33, or the like, as shown in FIG. 3. Unlike an active device, however, passive communication devices do not have external energy sources, such as a battery. Upon coming into communication range of a reader device 1 and receiving a broadcasted interrogating signal 10a by the antenna 31 of the communication device 30, the resonant circuit 34 oscillates to convert the signal into energy. This energy is then stored in the resonant storage element 33 and made available for, among other things, processing and generating a response signal. In this regard, the amount of energy that is converted and stored will depend directly on the received signal strength of the broadcasted interrogating signal 10a, which is directly related to the distance between the communication device 30 and the reader device 1.

Figure 7:
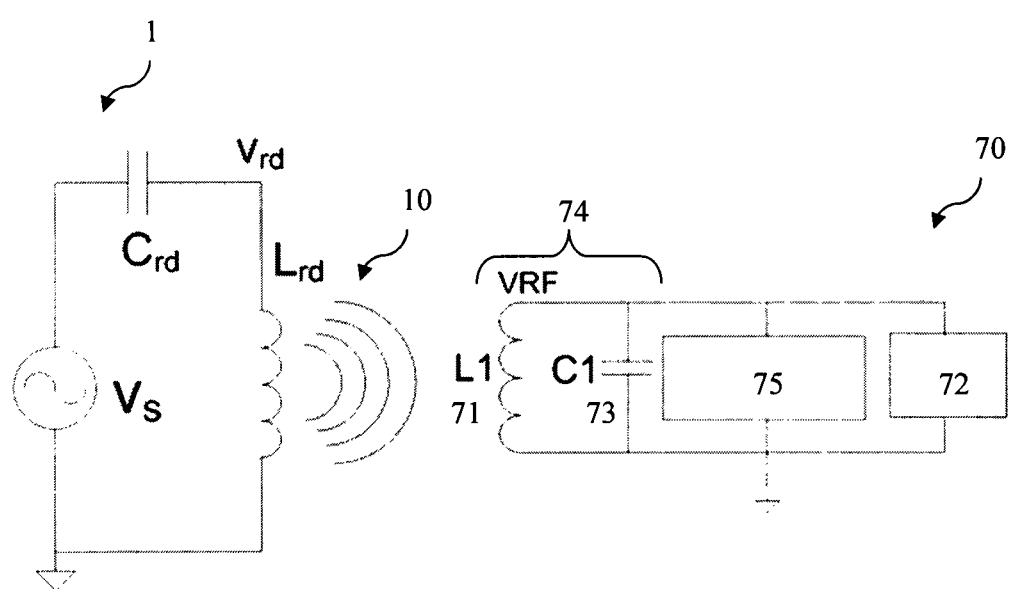
FIG. 7 is a block circuit diagram of an example embodiment of a communication device.

FIG. 7 represents an example embodiment of a communication system comprising a reader device 1 and a communication device 70. It is to be understood herein that example embodiments may comprise more than one reader device and/or more than one communication device, and the one or more communication devices may be either passive devices, active devices, or a combination thereof. Furthermore, the one or more reader devices and/or the one or more communication devices may be portable and/or stationary. The communication device 70 includes a selective energy circuit 75, a resonant circuit 74 having an antenna 71 and a resonant storage element 73, and a processor 72 having, among other things, one or more controllers and internal memory (not shown). The antenna 71 is preferably a conjugate match to the resonant storage element 73. That is, in representing the antenna 71 as inductance L1 and the resonant storage element 73 as capacitance C1, the antenna 71 and the resonant storage element 73 will be a conjugate match when they are selected based on the following resonance condition:

$$f_c = \frac{1}{2\pi\sqrt{L_1 C_1}},$$

where "fc" represents a carrier frequency of the communication system, L1 represents the inductance of the antenna and C1 represents the capacitance of the resonant storage element. It is to be understood herein that a communication device 70 based on different electronic circuitry may be used, while preferably maintaining a simple, compact and cost-efficient configuration.

Figure 8:
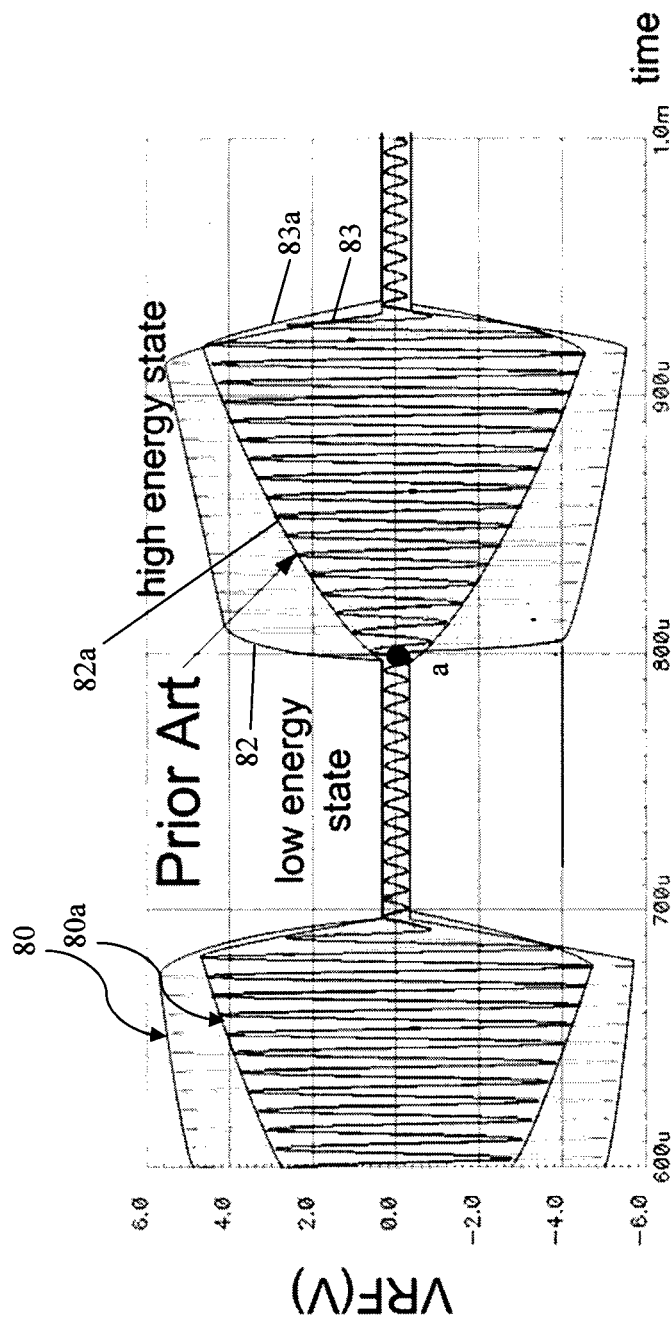
FIG. 8 is a diagram illustrating an example comparison of a response signal generated using conventional means and a response signal generated in an example embodiment.

When a communication device 70 and a reader device 1 are positioned such that they are within communication range, the antenna 71 will receive the broadcasted interrogating signal and convert it into energy for storage in the resonant storage element 73. The stored energy is then made available for use by the processor 72 to, among other things, generate a modulated signal. In example embodiments herein, a portion of the start up and initialization segment of the modulated signal may be drawn and stored as energy in the selective energy circuit 75. A generated modulated signal is continuously monitored, such as by performing a count of the number of times the amplitude of the modulated signal crosses zero volts (hereinafter "zero crossing"), the frequency of the signal, and/or periods of modulation and non-modulation. In this regard, the monitoring will anticipate as to when the modulated signal will transition from a high energy level to a low energy level. When the monitored modulated signal approaches the tail-end of a high energy level segment, the selective energy circuit 75 is activated to draw and store energy during the high energy level segment of the modulated signal. As a result, the transition from a high energy level to a low energy level in example embodiments may be comparable to those found in conventional communication devices, as illustrated by the steep downward transition 83 of the envelope of the response signal 80 as compared to the downward transition 83a of the envelope of the response signal 80a in FIG. 8. It is to be understood herein that the selective energy circuit may also activate to draw and store energy by other means, during other times and from other sources in addition to, or in replacement of, the said tail-end of a high energy level segment, such as during the mid-section of a high energy level segment, from non-modulating periods of the communication system, from other electro-magnetic energy sources that are associated or unassociated with the communication system, and the like.

Figure 9:
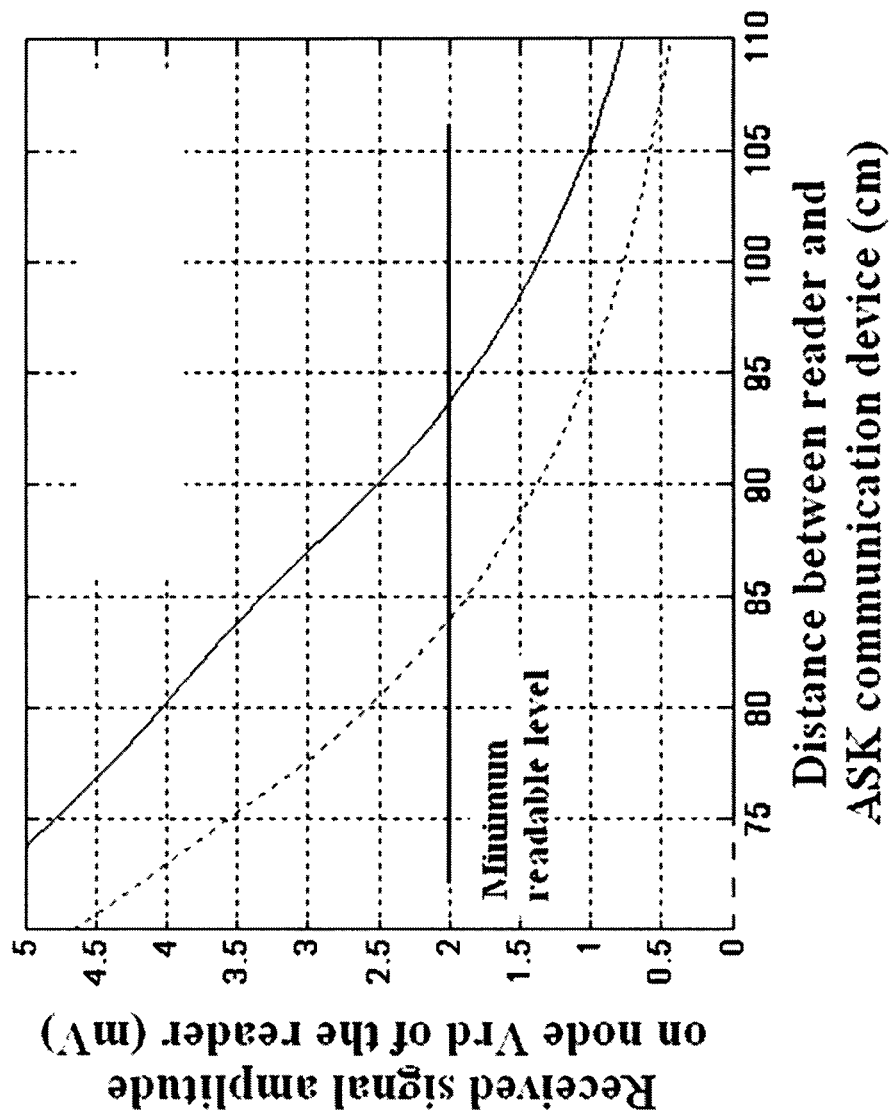
FIG. 9 is a diagram illustrating an example comparison of communication range achievable using conventional means and in an example embodiment.

The modulated signal continues to be monitored so as to anticipate when the modulated signal will approach a transitioning from a low energy level to a high energy level. Upon or after transitioning of the modulated signal from a low energy level to a high energy level, that is, on or after the first zero crossing of a high energy level segment such as that illustrated by point "a" in FIG. 8, the selective energy circuit 75 becomes activated to improve the high energy level segment. This is achieved by adding the stored energy of the selective energy circuit 75 into the high energy level segment upon or after the first zero crossing of the high energy level segment. As a result, the transition from a low energy level to a high energy level segment according to example embodiments will become much more steep than that found in conventional communication devices, as illustrated by the steep upward transition 82 of the envelope of the response signal 80 as compared to the slow (gradual) upward transition 82a of the envelope of the response signal 80a in FIG. 8. In this regard, example embodiments herein create an overall transmitted response signal having a significantly more rapid change when transitioning from a low energy level to a high energy level, increased overall amplitude of each high energy level segment (and increased overall difference between the amplitudes of high energy level and low energy level), and improved overall shape of each high energy level segment of the response signal. As a result, the overall communication range of example embodiments of the communication system herein will be substantially increased over conventional communication systems. Furthermore, the reliability of communications around extreme communication ranges of example embodiments of the communication system will be substantially improved over conventional communication systems. In this respect, the transient response of the reader device in example embodiments of the communication system in receiving the response signal from the communication device will be substantially improved over conventional communication systems. FIG. 9 illustrates an example improvement in communication range achievable using an example embodiment of the communication system over a conventional communication system.

Figure 10:
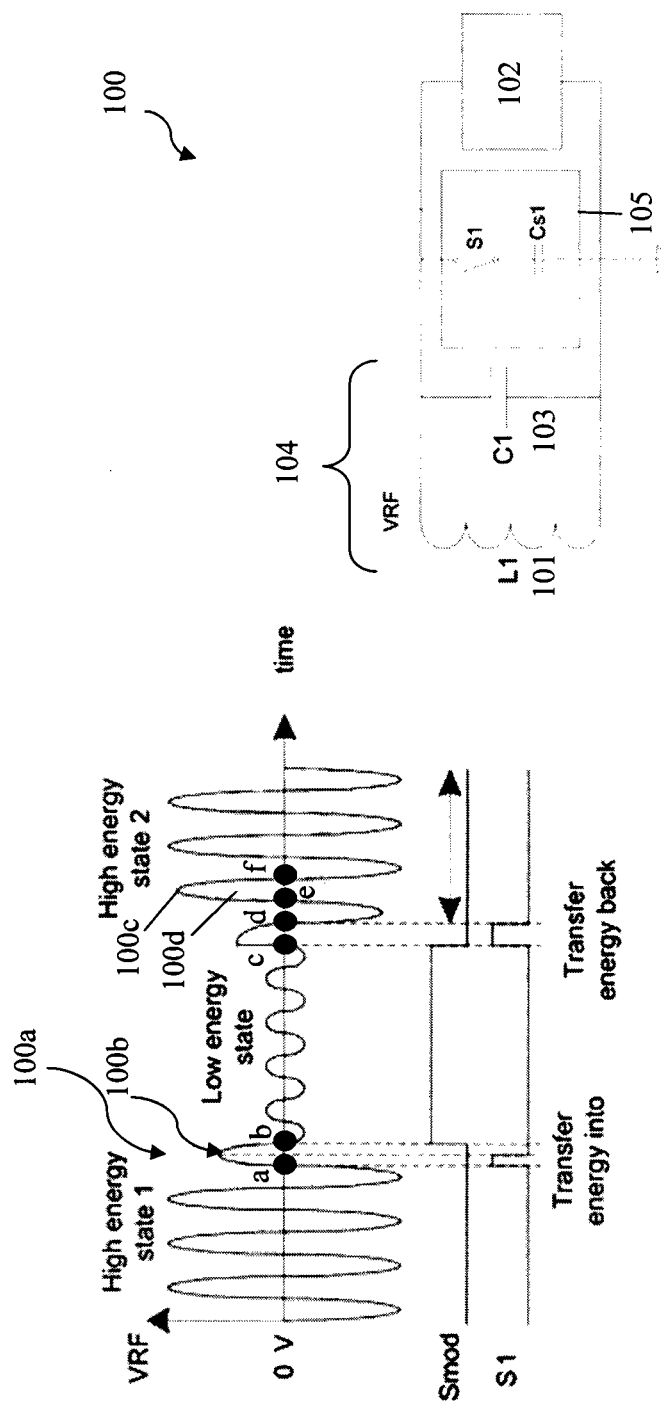
FIG. 10 illustrates a block circuit diagram of an example embodiment of a communication device, and a diagram of energy interactions in an example embodiment and using conventional means.

An example embodiment of a communication device 100 and the timing of the energy interactions between an example embodiment of a selective energy circuit 105 is shown in FIG. 10 along with a simplified illustration of the response signal waveform of the example embodiment and using conventional means. In the figure, "Smod" refers to the switching of modulation between a high energy level and a low energy level, and "S1" refers to the switching of energy interactions of the selective energy circuit 105 to either draw and store energy (transitions from a high energy level to a low energy level) or add energy (transitions from a low energy level to a high energy level). In the example embodiment, the modulated signal is monitored for an upcoming energy level transition, which can be a transition from either a low energy level to a high energy level or a high energy level to a low energy level. When an nth zero crossing is counted, wherein n is an integer and depicted in time by the symbol "a", switching S1 is performed to enable the selective energy circuit 105 to draw and store energy. As a result, the amplitude of the tail-end of the high energy level segment after time "a" reduces to take the shape of the response signal portion 100b instead of the modulated signal portion 100a. It is to be understood herein that the nth crossing may vary between communication systems and may depend on the modulation standard/protocol used in the communication system. Thereafter, the modulated signal continues to be monitored by, for example, counting until reaching a pth zero crossing, wherein p is an integer and depicted in time by the symbol "c". On or after this point, the switching S1 is performed to release energy from the selective energy circuit 105 to be added to the modulated signal. It is to be understood herein that the energy release to be added to the modulated signal may inclusively be within or between two zero crossings, as depicted by the points "c" and "d", inclusively within or between less than two zero crossings, or inclusively within or between more than two zero crossings. For example, the energy transfer may inclusively be within or between "c" and "f" or inclusively within or between "c" and "e". In respect to the latter, the storage element Cs1, such as a capacitor, of the selective energy circuit may require a larger size with inverted polarity. Referring back to the example embodiment of energy transfer inclusively within or between "c" and "d", the modulated signal on or after time "c" increases in amplitude and takes the shape of response signal portion 100c instead of modulated signal portion 100d. It is to be understood herein that the pth crossing may vary between communication systems and may depend on the applied modulation standard/protocol. It is also to be understood herein that the number of zero crossings represented by the nth crossing and the pth crossing may be the same or different, depending on the applied modulation standard/protocol.

Figure 11A:
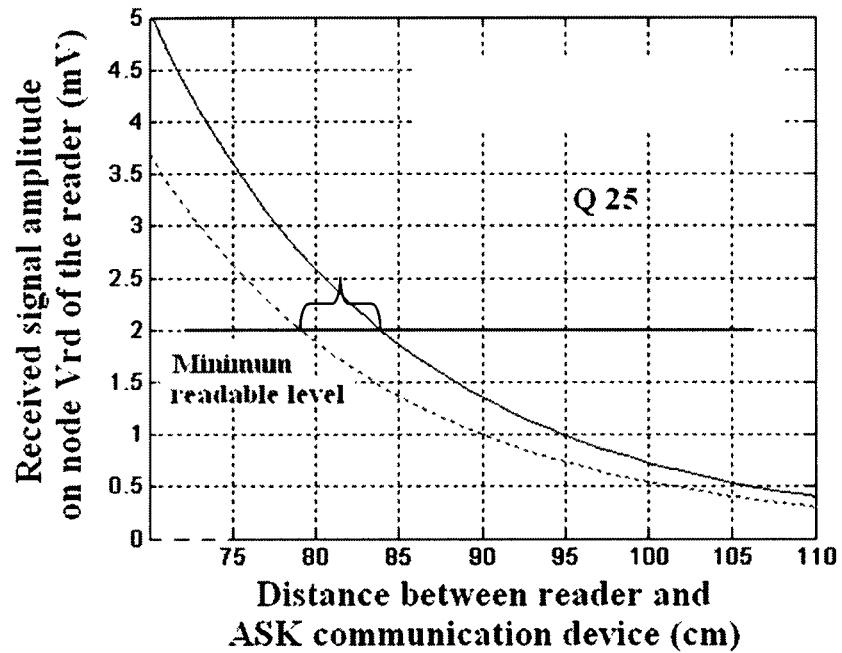
FIG. 11a is a diagram illustrating the communication range using an antenna with quality factor of 25 in an example embodiment and using conventional means.
Figure 11B:
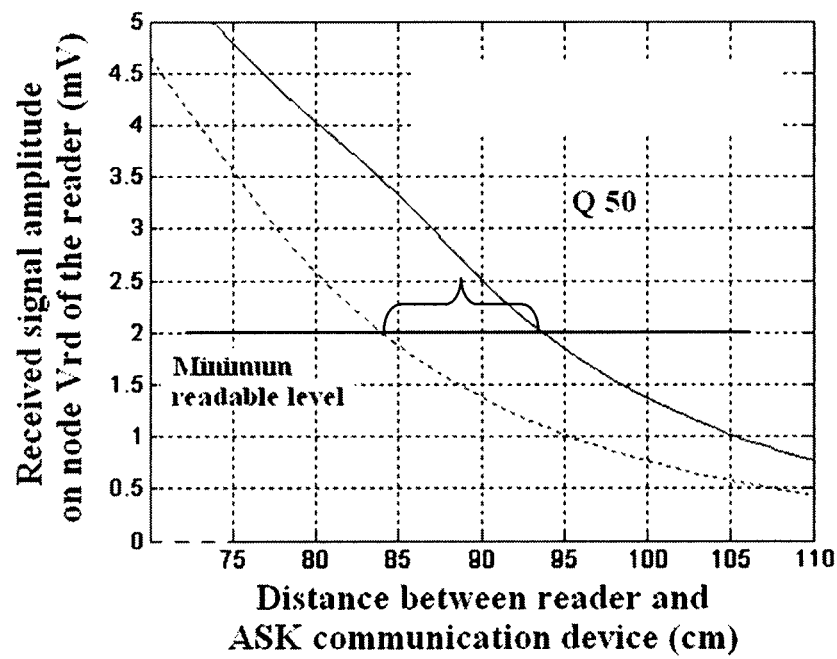
FIG. 11b is a diagram illustrating the communication range using an antenna with quality factor of 50 in an example embodiment and using conventional means.
Figure 11C:
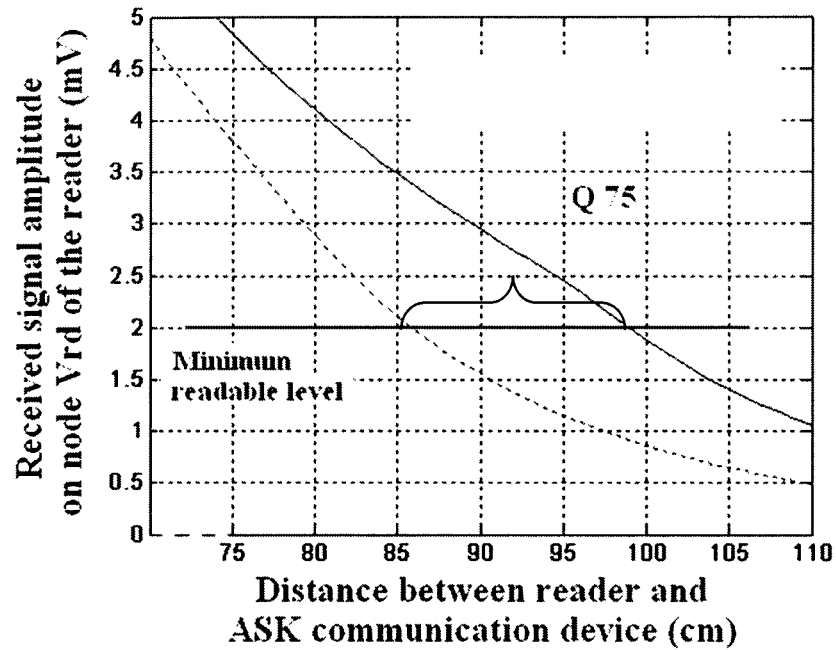
FIG. 11c is a diagram illustrating the communication range using an antenna with quality factor of 75 in an example embodiment and using conventional means.
Figure 11D:
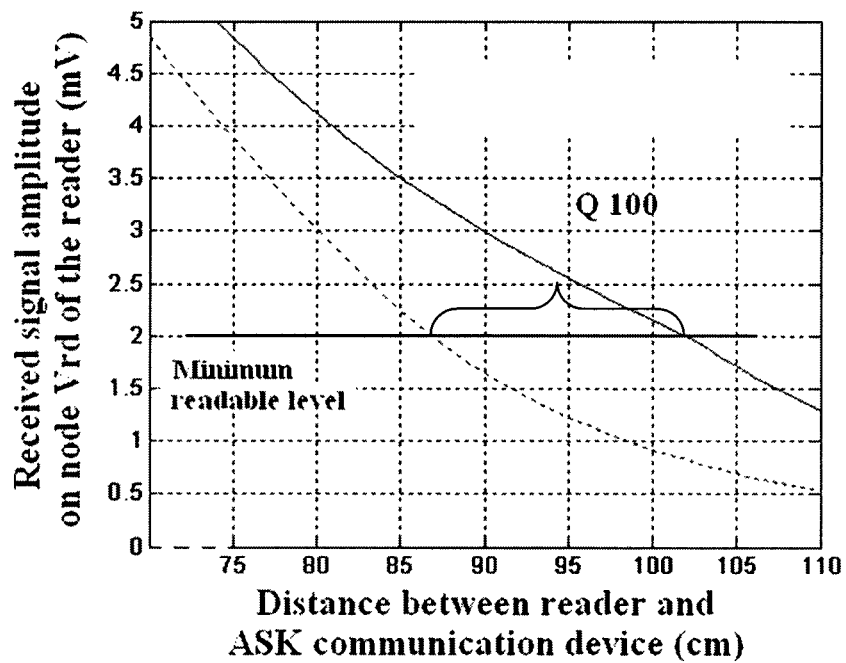
FIG. 11d is a diagram illustrating the communication range using an antenna with quality factor of 100 in an example embodiment and using conventional means.

In example implementations of the example embodiment of FIG. 10, it is recognized herein that the rapidly increased transition from a low energy level to a high energy level through use of the selective energy circuit 105, as represented by the improved overall shape of the high energy level segment, may sometimes cause disturbance in the natural oscillation of the resonance circuit 104 and thereby affect, among other things, the achievable increase in communication range and reliability of communications at extreme communication ranges of the communication system. In this regard, ignoring small variations and other external factors, such as parasitic elements, time delay of control signals, and the like, it is recognized herein that an optimum design of an example embodiment of the communication device 100 so as to reduce or eliminate such disturbance in the natural oscillation of the resonance circuit 104 requires the capacitor Cs1 of the selective energy circuit 105 to be larger in capacitance than the resonant storage element, and preferably having a capacitance value between about 2 to 3.5 times the size of the resonant storage element C1. It is further recognized herein that improvements are achievable when using capacitor Cs1 of the selective energy circuit 105 having a capacitance between about 2.5 to 3 times the value of C1, and preferably having a capacitance of about 2.7 times the value of C1. It is further recognized herein that the rapidly increased transition from a low energy level to a high energy level, as represented by the improved overall shape of the high energy level segment, the achievable increase in communication range and the improved reliability of communications at extreme communication ranges of the communication system are achievable in example embodiments by alternating the roles of the resonant storage element and the selective energy circuit upon a transition between a high energy level and a low energy level. Furthermore, it is further recognized herein that example embodiments of the communication device utilizing higher antenna qualities (quality factor) will achieve greater achievable improvements to communication range and reliability of communications at extreme communication ranges of communication system, as illustrated in FIG. 11a, FIG. 11b, FIG. 11c and FIG. 11d. For example, as illustrated in FIG. 11b, an example embodiment of a communication system using an antenna quality factor of 50 achieved an improvement in communication range of about 10%. An example embodiment of a communication system using a higher antenna quality factor of 100 achieved an improvement in communication range of about 16%.

Figure 12:
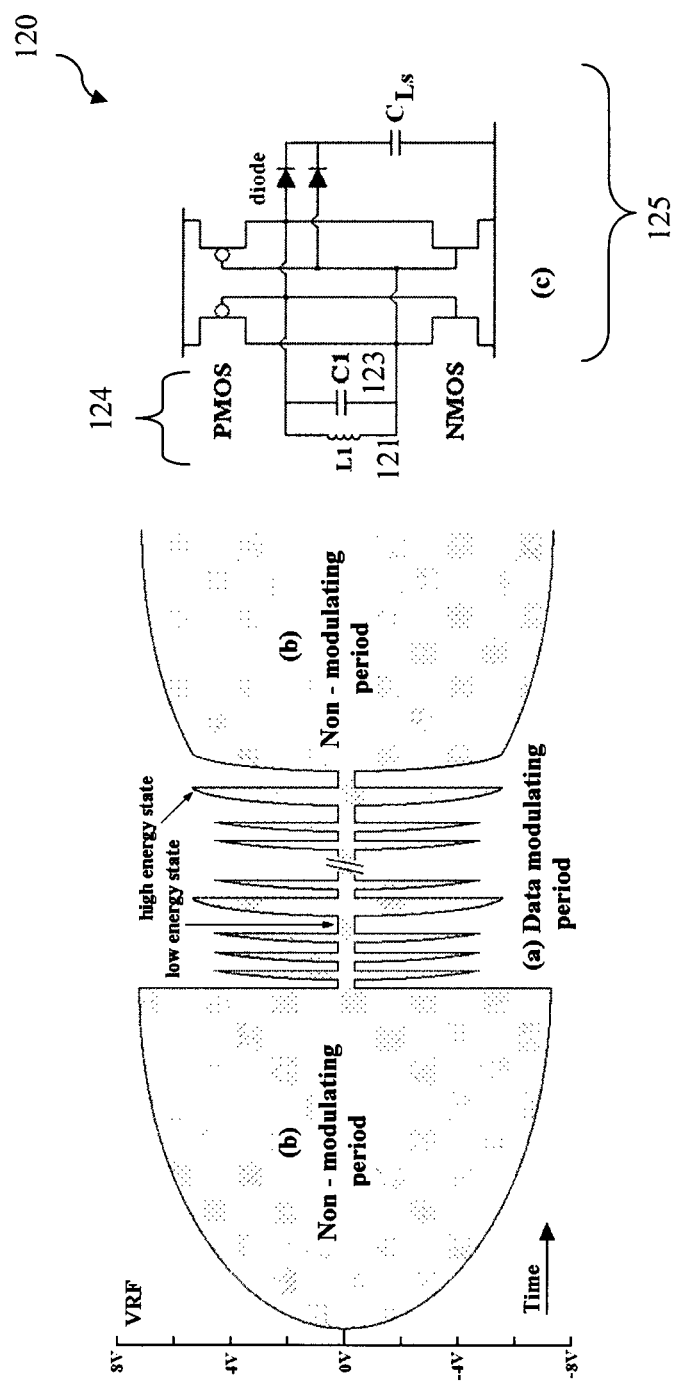
FIG. 12 is a diagram illustrating an example embodiment of a communication device that draws and stores energy during non-modulating periods.

In another example embodiment, the communication device 120 may draw and store energy into the selective energy circuit 125 from other electromagnetic sources in the air and/or during non-modulating periods in addition to, or in replacement of, drawing and storing energy from received interrogating signals, as illustrated in FIG. 12. In implementing such energy storage means, the selective energy circuit 125 may comprise various forms of circuits, including PMOS and NMOS transistors, diodes and large storage elements CLs. In such implementations, it is recognized herein that the storage element CLs is preferably larger in capacitance than the resonant storage element C1, and preferably having a capacitance at least 50 times the size of resonant storage element C1. It is to be understood herein that a communication device 120 based on different electronic circuitry may be used, while preferably maintaining a simple, compact and cost-efficient configuration.

In example implementations, it is recognized herein that various modifications to the example embodiment of the communication system of FIG. 10 are possible, including modifications to the selective energy circuit of the communication device by utilizing a plurality of storage elements, one or more other electronic circuit elements, a plurality of energy transfer interactions and/or impulse (small pulse width) energy transfers, parallel and/or series storage elements, separation of the resonance circuit from the selective energy circuit and/or the processor, alternating the polarity of the storage element, controlling the amount of energy supplied to the processor, and indirect energy transfers. Example embodiments of these modifications will now be described in FIGS. 13 to 17.

Figure 13:
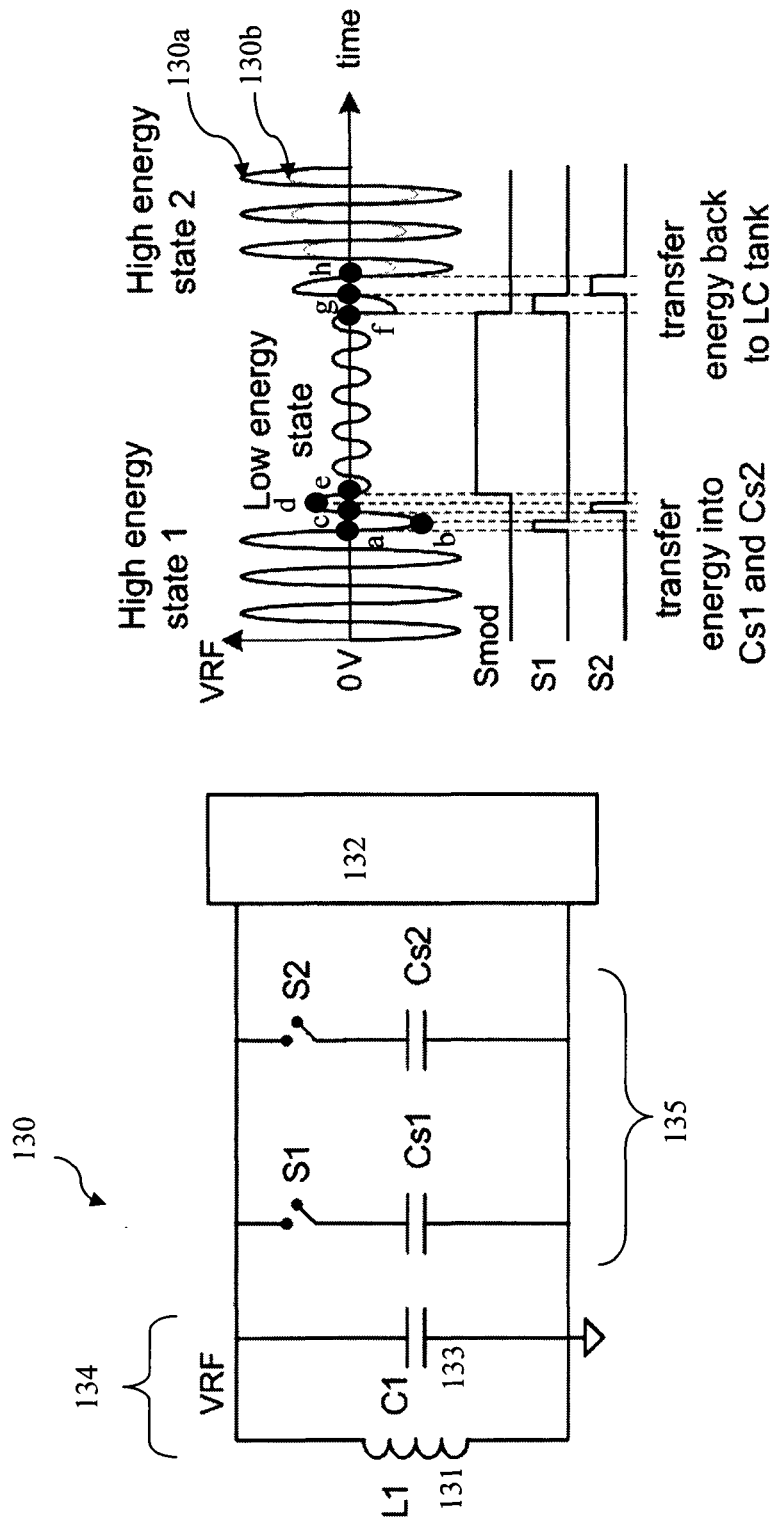
FIG. 13 illustrates a block circuit diagram of an example embodiment of a communication device, and a diagram of energy interactions in an example embodiment and using conventional means.

FIG. 13 depicts an example embodiment of a communication device 130 having a plurality of storage elements and a plurality of energy transfer interactions, along with a timing illustration of the energy interactions between an example embodiment of a selective energy circuit 135 and a simplified illustration of the response signal waveform of the example embodiment and using conventional means. In the figure, "Smod" refers to the switching of modulation between a high energy level and a low energy level, and "S1" and "S2" refer to multiple switching of energy interactions of the selective energy circuit 135 to either draw and store energy (transitions from a high energy level to a low energy level) or add energy (transitions from a low energy level to a high energy level). It is to be understood herein that more than two switching interactions are possible in example embodiments. In the example embodiment, the modulated signal is monitored for an upcoming energy level transition, which can be a transition from either a low energy level to a high energy level or a high energy level to a low energy level. Upon or after the counting of an nth zero crossing, wherein n is an integer and depicted in time by the symbol "a", the switching S1 is performed so as to allow the selective energy circuit 135 to draw and store energy until or after a subsequent peak (in this case, a negative peak) is reached, as depicted in time by the symbol "b". It is to be understood herein that the nth crossing may vary between communication systems and may depend on the modulation standard/protocol used in the communication system. Thereafter, the selective energy circuit 135 waits for an n+1th zero crossing, as depicted in time by the symbol "c", and upon or after that time performs switching S2 to draw and store energy until or after a subsequent peak (in this case, a positive peak) is reached, as depicted in time by the symbol "d". Thereafter, the modulated signal continues to be monitored by, for example, counting until or after reaching a pth zero crossing, wherein p is an integer and depicted in time by the symbol "f". Upon or after the pth zero crossing, the switching S1 is performed so as to release energy from the selective energy circuit 135 to be added to the modulated signal. Thereafter, the selective energy circuit 135 waits for an p+1th zero crossing, as depicted in time by the symbol "g", and upon or after that performs switching S2 to release more energy to be added to the modulated signal until or after a subsequent zero crossing is reached, as depicted in time by the symbol "h". Referring back to the example embodiment of the energy transfer inclusively within or between "f" and "h", the modulated signal on or after time "f" increases in amplitude and takes the improved shape of response signal 130a instead of modulated signal 130b. It is to be understood herein that the applicable zero crossings may vary between communication systems and may depend on the applied modulation standard/protocol. It is also to be understood herein that the number of zero crossings represented by the nth crossing and the pth crossing may be the same or different, depending on the applied modulation standard/protocol.

In example implementations of the example embodiment of FIG. 13, it is recognized herein that an optimum design of the example embodiment of the communication device 130 so as to reduce or eliminate disturbances in the natural oscillation of the resonance circuit 134 requires the capacitor Cs1 to be larger in capacitance than the resonant storage element C1, and preferably having a capacitance about 3 times the size of the resonant storage element C1, and the capacitor Cs2 to be larger than the resonant storage element C1, and preferably having a capacitance less than 3 times the size of the resonant storage element C1. It is to be understood herein that a communication device 130 based on different electronic circuitry may be used, while preferably maintaining a simple, compact and cost-efficient configuration.

Figure 14:
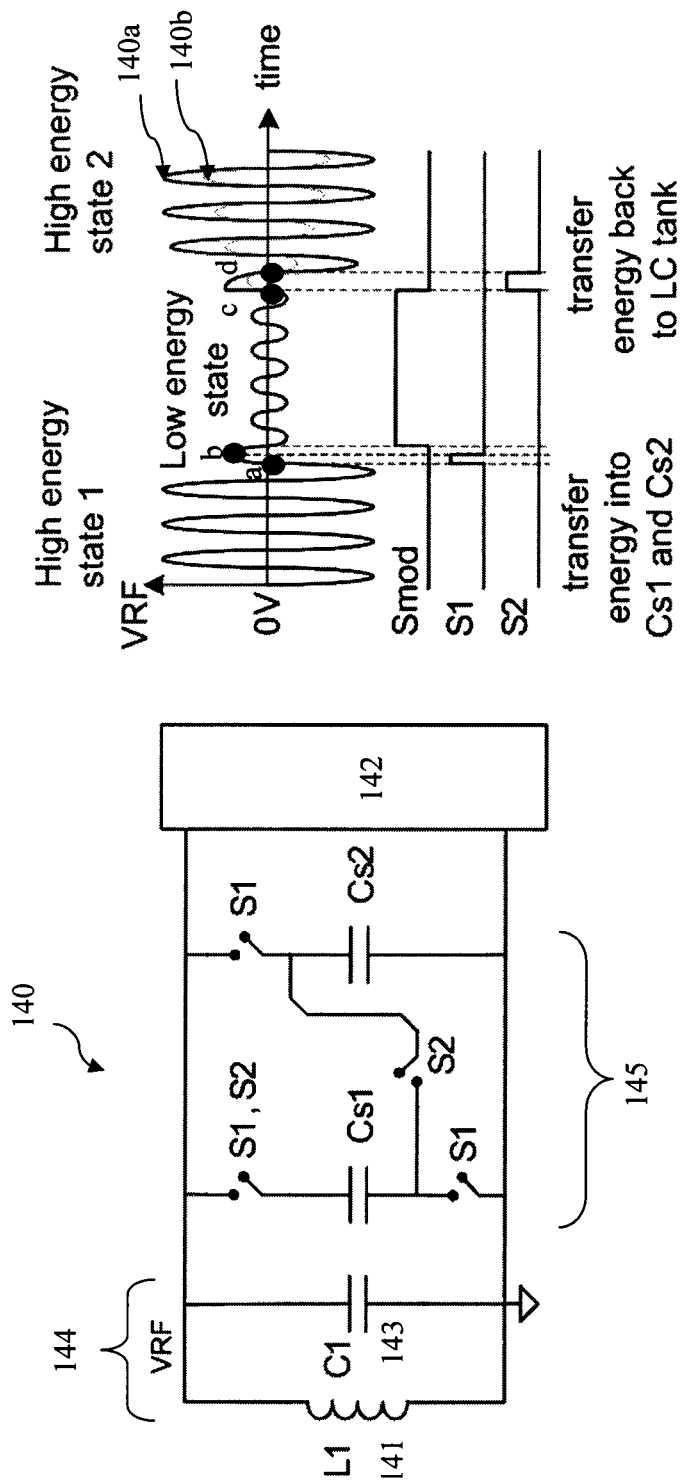
FIG. 14 illustrates a block circuit diagram of an example embodiment of a communication device, and a diagram of energy interactions in an example embodiment and using conventional means.

FIG. 14 depicts an example embodiment of a communication device 140 having a plurality of storage elements, along with a timing illustration of the energy interactions between an example embodiment of a selective energy circuit 145 and a simplified illustration of the response signal waveform of the example embodiment and using conventional means. In the figure, "Smod" refers to the switching of modulation between a high energy level and a low energy level, "S1" refers to switching of energy interactions of the selective energy circuit 145 to draw and store energy (transitions from a high energy level to a low energy level), and "S2" refers to switching of energy interactions of the selective energy circuit 145 to release energy (transitions from a low energy level to a high energy level). In the example embodiment, the modulated signal is monitored for an upcoming energy level transition, which can be a transition from either a low energy level to a high energy level or a high energy level to a low energy level. Upon or after the counting of an nth zero crossing, wherein n is an integer and depicted in time by the symbol "a", the switching S1 is performed so as to draw and store energy into the selective energy circuit 145 until or after a subsequent peak (in this case, a positive peak) is reached, as depicted in time by the symbol "b". As can be seen from the circuit diagram, closing of the three S1 switches will result in storage elements Cs1 and Cs2 to be configured in parallel. It is to be understood herein that the nth crossing may vary between communication systems and may depend on the modulation standard/protocol used in the communication system. Thereafter, the modulated signal continues to be monitored by, for example, counting until or after reaching a pth zero crossing, wherein p is an integer and depicted in time by the symbol "c". On or after this point, the switching S2 is performed so as to release energy from the selective energy circuit 145 to be added to the modulated signal. As can be seen from the circuit diagram, closing of the two S2 switches will result in storage elements Cs1 and Cs2 to be configured in series. Furthermore, as can be seen from the waveform signal of FIG. 14, the modulated signal on or after time "c" increases in amplitude and takes the improved shape of the response signal 140a instead of the modulated signal 140b. It is to be understood herein that the applicable zero crossings may vary between communication systems and may depend on the applied modulation standard/protocol. It is also to be understood herein that the number of zero crossings represented by the nth crossing and the pth crossing may be the same or different, depending on the applied modulation standard/protocol.

In example implementations of the example embodiment of FIG. 14, it is recognized herein that an optimum design of the example embodiment of the communication device 140 so as to reduce or eliminate disturbances in the natural oscillation of the resonance circuit 144 requires each of capacitors Cs1 and Cs2 to be larger in capacitance than the resonant storage element C1, and preferably having a capacitance about 6 times the size of the resonant storage element C1. It is to be understood herein that a communication device 140 based on different electronic circuitry may be used, while preferably maintaining a simple, compact and cost-efficient configuration.

Figure 15:
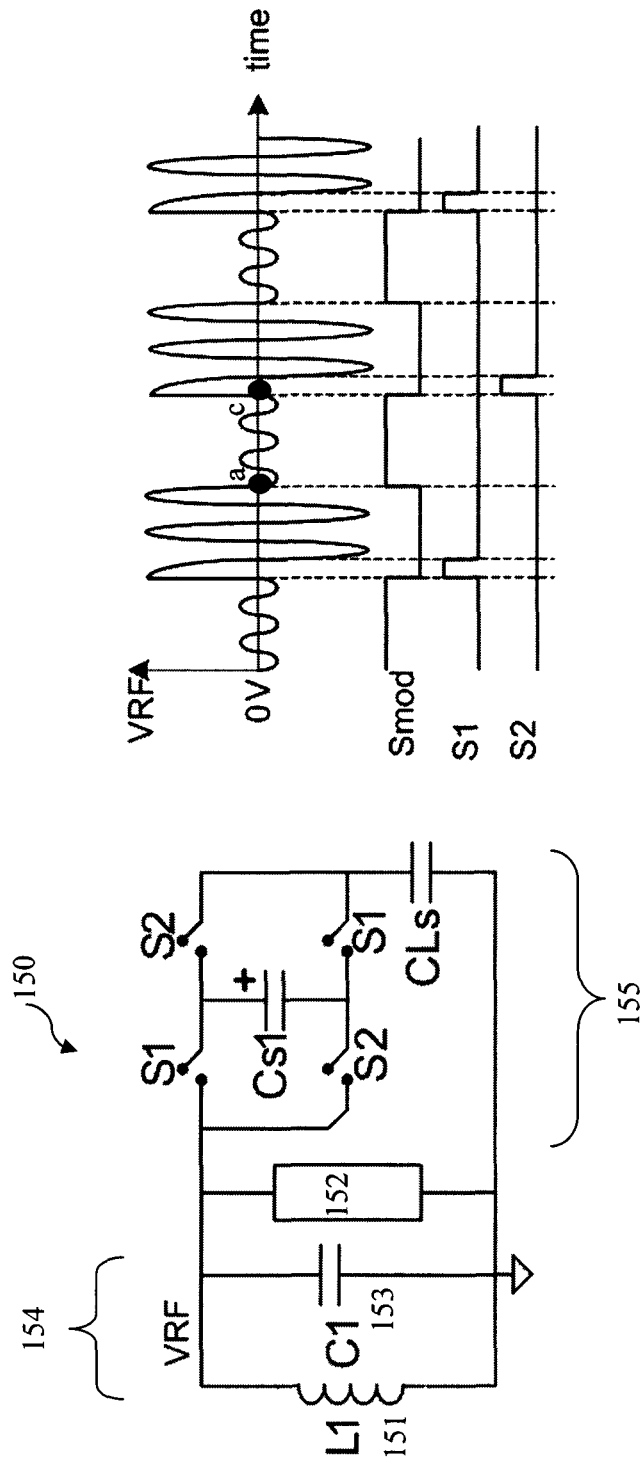
FIG. 15 illustrates a block circuit diagram of an example embodiment of a communication device, and a diagram of energy interactions in an example embodiment.

FIG. 15 depicts an example embodiment of a communication device 150 having a plurality of storage elements configured to be in series and having alternating polarity, along with a timing illustration of the energy interactions between an example embodiment of a selective energy circuit 155 and a simplified illustration of the response signal waveform of the example embodiment and using conventional means. In the figure, "Smod" refers to the switching of modulation between a high energy level and a low energy level, and "S1" and "S2" may be alternately used to switch energy interactions of the selective energy circuit 155 to release energy (transitions from a low energy level to a high energy level). The large energy storage element CLs is a large storage element, such as a large capacitor, which can be either charged during non-modulating periods, when not used to supply energy, or can be a battery such as that used in active devices. In this example embodiment, the modulated signal is monitored for an upcoming energy level transition, which can be a transition from either a low energy level to a high energy level or a high energy level to a low energy level. Upon or after the counting an nth zero crossing, wherein n is an integer and depicted in time by the symbol "a", the switching S1 is performed so as to cause a fast change in energy level from a low energy level to a high energy level. As can be seen from the circuit diagram, closing of the two S1 switches will result in storage element Cs1 to have a positive voltage across and storage elements Cs1 and CLs to be configured in series (stacked) in the transfer of energy to the resonance circuit. After the energy transfer, voltage across Cs1 becomes negative. It is to be understood herein that the nth crossing may vary between communication systems and may depend on the modulation standard/protocol used in the communication system. Thereafter, the modulated signal continues to be monitored by, for example, counting until reaching a pth zero crossing, wherein p is an integer and depicted in time by the symbol "c". Upon or after the pth zero crossing, the switching S2 is performed so as to release energy from the selective energy circuit 155 to be added to the modulated signal. As can be seen from the circuit diagram, closing of the two S2 switches will result in the flipping of polarity of storage element Cs1 and a fast change in energy level from a low energy level to a high energy level, as represented by the improved shape of the response signal. It is to be understood herein that the applicable zero crossings may vary between communication systems and may depend on the applied modulation standard/protocol. It is also to be understood herein that the number of zero crossings represented by the nth crossing and the pth crossing may be the same or different, depending on the applied modulation standard/protocol.

In example implementations of the example embodiment of FIG. 15, it is recognized herein that an optimum design of the example embodiment of the communication device 150 so as to reduce or eliminate disturbances in the natural oscillation of the resonance circuit 154 requires capacitors Cs1 and CLs to be larger in capacitance than the resonant storage element C1, and preferably having a capacitance of about 3 times and greater than 50 times the value of the resonant storage element C1, respectively. It is to be understood herein that a communication device 150 based on different electronic circuitry may be used, while preferably maintaining a simple, compact and cost-efficient configuration.

Figure 16:
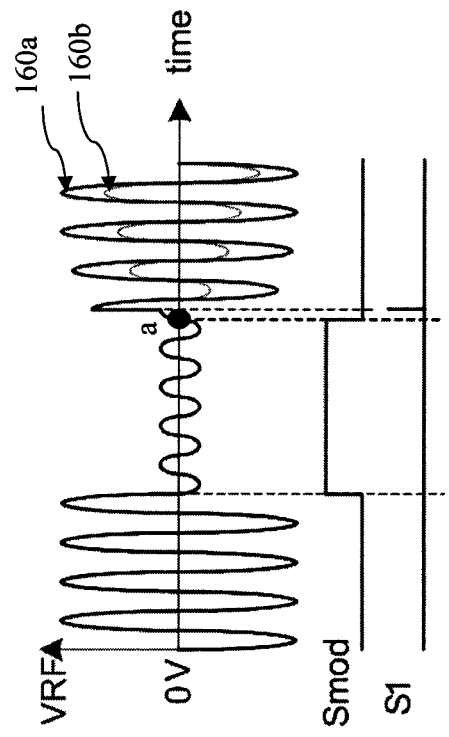
FIG. 16 illustrates a block circuit diagram of an example embodiment of a communication device, and a diagram of energy interactions in an example embodiment and using conventional means.
Figure 16:
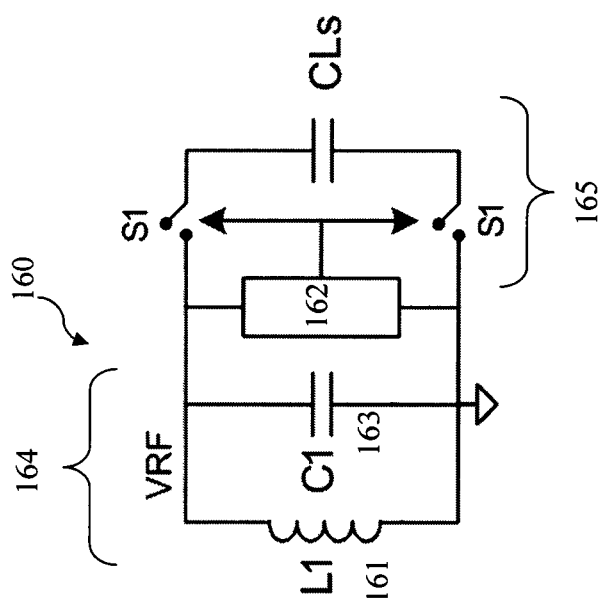

FIG. 16 depicts an example embodiment of a communication device 160 having a large storage element, along with a timing illustration of the energy interactions between an example embodiment of a selective energy circuit 165 and a simplified illustration of the response signal waveform of the example embodiment and using conventional means. In the figure, "Smod" refers to the switching of modulation between a high energy level and a low energy level, and "S1" refers to the switching of energy interactions of the selective energy circuit 165 to release a pulse of energy (transitions from a low energy level to a high energy level). The large energy storage element CLs is a large storage element, such as a large capacitor, which can be either charged during non-modulating periods, when not used to supply energy, or can be a battery, such as that used in active devices. In this example embodiment, the modulated signal is monitored for an upcoming energy level transition from a low energy level to a high energy level, and in particular, the last zero crossing of a low energy level segment. Upon or after the counting of an nth zero crossing, wherein n is an integer and depicted in time by the symbol "a", the selective energy circuit 165 waits for a midpoint between the nth zero crossing and n+1th zero crossing and then a very short duration switching S1 is performed so as to cause a fast change in energy level from a low energy level to a high energy level. As can be seen from the circuit diagram, a very short duration closing of the two S1 switches will result in storage element CLs transferring a pulse of energy to the resonance circuit. The modulated signal upon or after time "a" increases in amplitude and takes the improved shape of the response signal 160a instead of the modulated signal 160b. It is to be understood herein that the nth crossing may vary between communication systems and may depend on the modulation standard/protocol used in the communication system.

In example implementations of the example embodiment of FIG. 16, it is recognized herein that an optimum design of the example embodiment of the communication device 160 so as to reduce or eliminate disturbances in the natural oscillation of the resonance circuit 164 requires capacitor CLs to be substantially larger in capacitance than the resonant storage element C1, and preferably having a capacitance greater than 50 times the size of the resonant storage element C1. It is to be understood herein that a communication device 160 based on different electronic circuitry may be used, while preferably maintaining a simple, compact and cost-efficient configuration.

Figure 17:
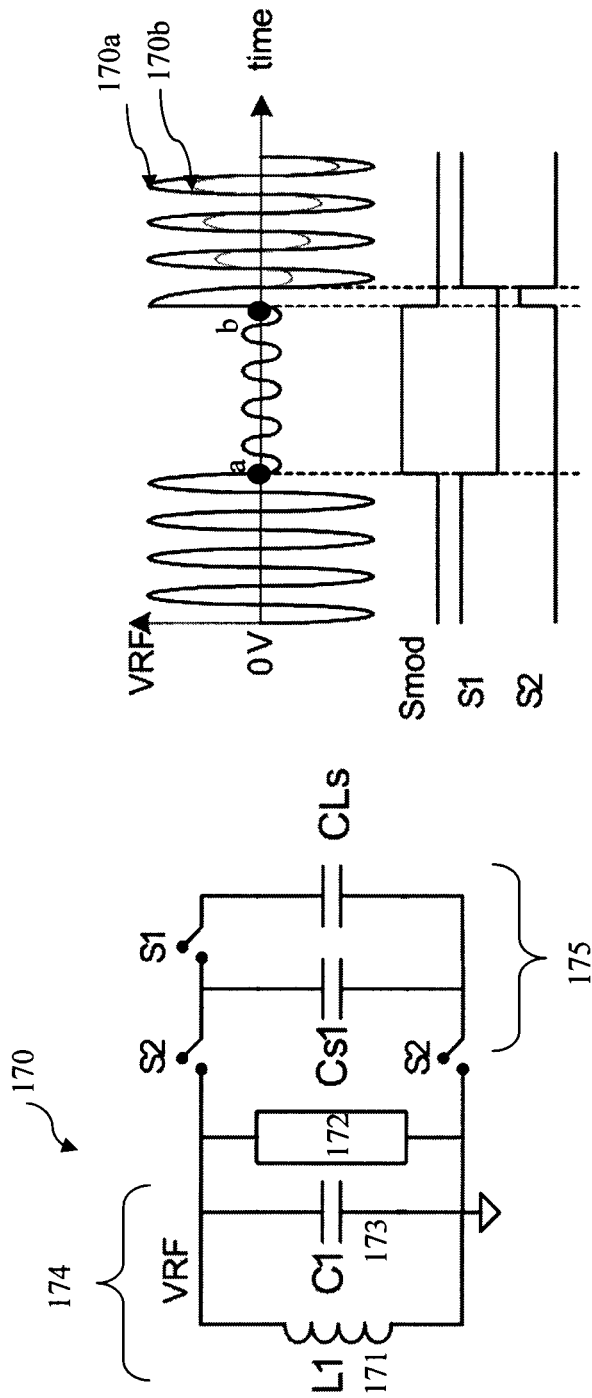
FIG. 17 illustrates a block circuit diagram of an example embodiment of a communication device, and a diagram of energy interactions in an example embodiment and using conventional means.

FIG. 17 depicts an example embodiment of a communication device 170 having a plurality of storage elements that may provide for indirect energy transfers, along with a timing illustration of the energy interactions between an example embodiment of a selective energy circuit 175 and a simplified illustration of the response signal waveform of the example embodiment and using conventional means. In the figure, "Smod" refers to the switching of modulation between a high energy level and a low energy level, and "S1" and "S2" are used to switch energy interactions of the selective energy circuit 175 to release energy (transitions from a low energy level to a high energy level). The large energy storage element CLs is a large storage element, such as a large capacitor, which can be either charged during non-modulating periods, when not used to supply energy, or can be a battery, such as that in an active device. In this example embodiment, the modulated signal is monitored for an upcoming energy level transition from a low energy level to a high energy level. Upon or after the counting of an nth zero crossing, wherein n is an integer and depicted in time by the symbol "a", the switching S2 is performed so as to cause a fast change in energy level upon transitioning from a low energy level to a high energy level. As can be seen from the circuit diagram, closing of the two S2 switches will result in storage element Cs1 to be configured in parallel with the resonance storage element C1 in the transfer of energy to the resonance circuit. At the same time, the switch S1 is opened and therefore causes an isolation of the large energy storage element CLs from the rest of the circuit. Upon or after the energy transfer, the two S2 switches are opened, as depicted in time by the symbol "b", and the switch S1 is commanded closed. Commanding switch S1 closed enables the large energy storage element CLs to transfer energy into storage element Cs1. The modulated signal on or after time "a" increases in amplitude and takes the improved shape of response signal 170a instead of modulated signal 170b. It is to be understood herein that the nth crossing may vary between communication systems and may depend on the modulation standard/protocol used in the communication system.

In example implementations of the example embodiment of FIG. 17, it is recognized herein that an optimum design of the example embodiment of the communication device 170 so as to reduce or eliminate disturbances in the natural oscillation of the resonance circuit 174 requires capacitors Cs1 and CLs to be larger in capacitance than the resonant storage element C1, and preferably having a capacitance about 3 times and greater than 50 times the size of the resonant storage element C1, respectively. It is to be understood herein that a communication device 170 based on different electronic circuitry may be used, while preferably maintaining a simple, compact and cost-efficient configuration.

Although the aforesaid example embodiments provide for communication system improvements over those previously known in the art, with some references to example embodiments and applications in the RFID industry, it is to be understood by persons ordinarily skilled in the art that example embodiments described herein are merely intended to facilitate understanding of the present invention, and implies no limitation thereof. Various modifications and improvements of the example embodiments are possible without departing from the spirit and scope thereof as recited in the appended claims, and these will naturally be included as equivalents in the present invention.

Furthermore, various modifications and improvements of example embodiments are applicable in other applications and industries without departing from the spirit and scope thereof as recited in the appended claims, and these too will naturally be included as equivalents in the present invention.

What is claimed is:

1. A communication device for communicating with one or more reader devices, said communication device comprising:
    an antenna;
    a resonant storage element, the resonant storage element stores at least some energy as received by the antenna to produce stored energy;
    a processor for controlling a release of stored energy to generate a modulated signal, wherein said modulated signal is a signal comprising digital data represented by at least one predefined sequence of transitions between a high energy level and a low energy level; and
    a selective energy circuit in selective cooperation with the resonant storage element which utilizes detection of zero crossings to identify a storage point and a transfer point to store energy in the resonant storage element and to efficiently transfer the stored energy between the resonant storage element and the selective energy circuit, wherein a greater high energy level amplitude of the modulated signal is produced by adding the stored energy into the high energy level upon or after a first zero crossing of the low energy level to the high energy level to generate a steep transition from the low energy level to the high energy level, and wherein the greater high energy level amplitude of the modulated signal increases the overall difference between amplitudes of the high energy level and the low energy level.

2. The communication device according to claim 1, wherein the said greater high energy level amplitude is generated by a release of stored energy from the selective energy circuit.

3. The communication device according to claim 2, wherein the stored energy of the selective energy circuit is drawn from energy stored in the resonant storage element.

4. The communication device according to claim 3, wherein the drawing of energy from the resonant storage element occurs during data transmission times.

5. The communication device according to claim 4, wherein the drawing of energy from the resonant storage element occurs before the modulated signal transitions from a high energy level to a low energy level.

6. The communication device according to claim 2, wherein the stored energy of the selective energy circuit is drawn during non-data transmission times.

7. The communication device according to claim 2, wherein the selective energy circuit comprises a capacitor for storing energy, said capacitor configurable to be in parallel with the resonant storage element when releasing and storing energy, said capacitor having a capacitance value between about 2 to 3.5 times the size of the resonant storage element.

8. The communication device according to claim 2, wherein the selective energy circuit comprises a first capacitor and a second capacitor, said first capacitor configurable to be in parallel with said second capacitor when storing energy and said first capacitor configurable to be in series with said second capacitor when releasing energy, said first capacitor having a capacitance value of about 6 times the size of the resonant storage element and said second capacitor having a capacitance value of about 6 times the size of the resonant storage element.

9. The communication device according to claim 2, wherein the selective energy circuit comprises a first capacitor and a second capacitor, said first capacitor and said second capacitor configurable to be in series when releasing and storing energy, said first capacitor having a capacitance value of about 3 times the size of the resonant storage element and said second capacitor having a capacitance value of at least 50 times the size of the resonant storage element, wherein the voltage polarity across the first capacitor is alternatable between a positive and a negative voltage polarity with each transition from a low energy level to a high energy level.

10. The communication device according to claim 2, wherein the selective energy circuit comprises a capacitor, said capacitor configurable to be in parallel with the resonant storage element when releasing an impulse of energy, said capacitor having a capacitance value of at least 50 times the size of the resonant storage element.

11. The communication device according to claim 2, wherein the selective energy circuit comprises a first capacitor and a second capacitor, said first capacitor configurable to be in parallel with said second capacitor when said first capacitor is drawing energy from said second capacitor, said first capacitor configurable to be in parallel with the resonant storage element when said first capacitor is releasing energy to the resonant storage element, said first capacitor having a capacitance value of about 3 times the size of the resonant storage element and said second capacitor having a capacitance value of at least 50 times the size of the resonant storage element.

12. The communication device according to claim 2, wherein the operation of storing of at least some energy received by the antenna and the operation of releasing of stored energy is alternatable between the resonant storage element and the selective energy circuit upon a transition between a high energy level and a low energy level.

13. A communication device for communicating with one or more reader devices, the communication device comprising:
an antenna;
a resonant storage element, the resonant storage element stores at least some energy as received by the antenna to produce stored energy;
a processor for controlling a release of stored energy to generate a modulated signal, wherein the modulated signal is a signal comprising digital data represented by at least one predefined sequence of transitions between a high energy level and a low energy level;
a selective energy circuit in selective cooperation with the resonant storage element which utilizes detection of zero crossing to identify a point to and efficiently transfer the stored energy between the resonant storage element and the selective energy circuit;
wherein the processor monitors the modulated signal and causes the selective energy circuit
to draw and store energy in the resonant storage element when a $n^{th}$ zero crossing is reached, wherein n is an integer, and
to release energy from the resonant storage element when a $p^{th}$ zero crossing is reached, wherein p is an integer greater than n; and
wherein a greater high energy level amplitude of the modulated signal is produced by adding the stored energy into the high energy level upon or after a first zero crossing of the low energy level to the high energy level to generate a steep transition from the low energy level to the high energy level, and wherein the greater high energy level amplitude of the modulated signal increases the overall difference between amplitudes of the high energy level and the low energy level.

14. The communication device according to claim 13, wherein the releasing of stored energy on or after the first zero crossing occurs in one or more separate steps.

15. A method of communicating in a communication system comprising:
receiving, at the communication device, an interrogating signal transmitted from a reader device;
converting, at the communication device, the received interrogating signal into a modulated signal having high and low energy levels;
drawing, by a selective energy circuit of the communication device, energy from the modulated signal to provide drawn energy after a $n^{th}$ zero crossing from a first zero crossing from the low energy level to the high energy level, where n is an integer;
storing the drawn energy in a resonant storage element of the communication device;
transferring the drawn energy from the resonant storage element to the modulated signal after a $p^{th}$ zero-crossing, wherein p is an integer greater than n, wherein transferring the drawn energy to the high energy levels of modulated signal increases the amplitude of the high energy levels of the modulated signal to produce an increased amplitude modulated signal, the increased amplitude modulated signal increases the overall difference between amplitudes of the high and low energy levels;
generating, at the communication device, a response signal for transmitting to the reader device the increased amplitude modulated signal.

16. The method according to claim 15, wherein the step of generating the response signal is achieved by adding additional energy to the increased amplitude modulated signal beginning on or after the first zero crossing of a high energy level segment of the modulated signal.

17. The method according to claim 16, wherein the adding of additional energy on or after the first zero crossing occurs in one or more separate steps.

18. The method according to claim 15, wherein the step of generating the response signal further comprises drawing energy from the converted energy.

19. The method according to claim 18, wherein the drawing of the energy occurs before the modulated signal transitions from a high energy level to a low energy level.

20. A communication system comprising:
one or more reader devices, wherein at least one reader device is for transmitting an interrogating signal and at least one reader device is for receiving a response signal as transmitted; and
a communication device for receiving an interrogating signal from at least one reader device, wherein the communication device
converts the interrogating signal into storable energy,
stores the converted storable energy into a resonant storage element,
generates a modulated signal using the stored energy, wherein the modulated signal is a signal comprising digital data represented by at least one predefined sequence of transitions between a high energy level and a low energy level,
monitors the modulated signal to detect zero crossings to identify a storage point and a transfer point to store energy in the resonant storage element and to efficiently transfer the stored energy, and
generates a response modulated signal from the modulated signal for transmission to at least one reader device, which has an increased amplitude in high energy by adding the stored energy into the high energy level upon or after the transfer point after a first zero crossing of the high energy level segment to generate a steep transition from the low energy level to the high energy level, and wherein the increased amplitude in the high energy level of the response signal increases the overall difference between amplitudes of the high energy level and the low energy level.

* * * * *